United States Patent [19]

Browning

[11] Patent Number: 5,356,349
[45] Date of Patent: Oct. 18, 1994

[54] HIGH-EFFICIENCY, HIGH-SPEED CONTROL UNIT FOR CHAIN SHIFTER

[75] Inventor: David L. Browning, Bainbridge Island, Wash.

[73] Assignee: Browning Automatic Transmissions, Bainbridge Island, Wash.

[21] Appl. No.: 134,077

[22] Filed: Oct. 8, 1993

[51] Int. Cl.⁵ ............................................. F16H 59/00
[52] U.S. Cl. ............................................. 474/78
[58] Field of Search ..................... 474/69, 70, 78–82

[56] References Cited

U.S. PATENT DOCUMENTS

| | | |
|---|---|---|
| 3,890,847 | 6/1975 | Dian . |
| 3,919,891 | 11/1975 | Stuhlmuller et al. . |
| 4,041,788 | 8/1977 | Nininger, Jr. . |
| 4,127,038 | 11/1978 | Browning . |
| 4,580,997 | 4/1986 | Browning et al. . |
| 4,605,240 | 8/1986 | Clem et al. . |
| 4,617,006 | 10/1986 | Nagano . |
| 4,756,704 | 7/1988 | Nagano . |
| 4,758,205 | 7/1988 | Durham . |
| 4,894,046 | 1/1990 | Browning ............................ 474/78 |
| 4,919,644 | 4/1990 | Carlyle . |
| 5,033,991 | 7/1991 | McLaren ............................. 474/78 |
| 5,261,858 | 11/1993 | Browning .......................... 474/78 X |

FOREIGN PATENT DOCUMENTS

| | | |
|---|---|---|
| 134214 | 11/1901 | Fed. Rep. of Germany . |
| 908832 | 4/1954 | Fed. Rep. of Germany . |
| 3118035 | 2/1982 | Fed. Rep. of Germany . |
| 2543639 | 10/1984 | France . |
| 2551418 | 3/1985 | France . |

OTHER PUBLICATIONS

"Zap! Mavic's electronic shifting system", by Lennard Zinn, Inside Triathlong, Jul. 1993, pp. 30–39.

Primary Examiner—Michael Powell Buiz
Attorney, Agent, or Firm—Seed and Berry

[57] ABSTRACT

A control unit for a chain shifter uses a reversible electric selector motor to position a cam selector within a pawl guide housing so that a traveling pawl will be directed as necessary for chain shifting. The motor rotates a low mass eccentric, the eccentric providing sufficient angular force to actuate a spring-loaded latch key, the key positioning the cam selector. As the eccentric accelerates, it gains sufficient force until it impacts and moves one of a pair of latch arms holding the key in a central position, allowing the latch key to rotate.

10 Claims, 7 Drawing Sheets

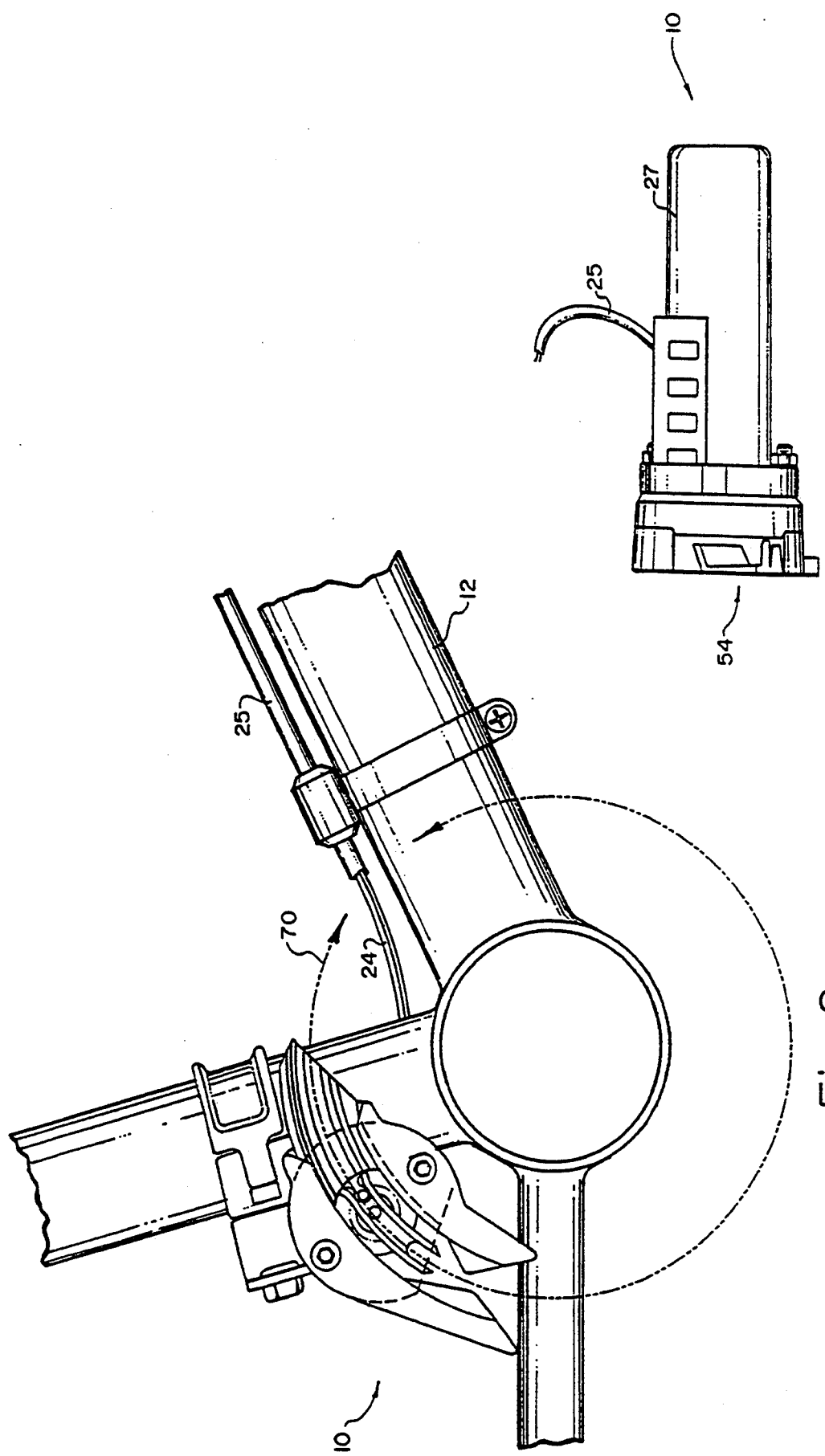

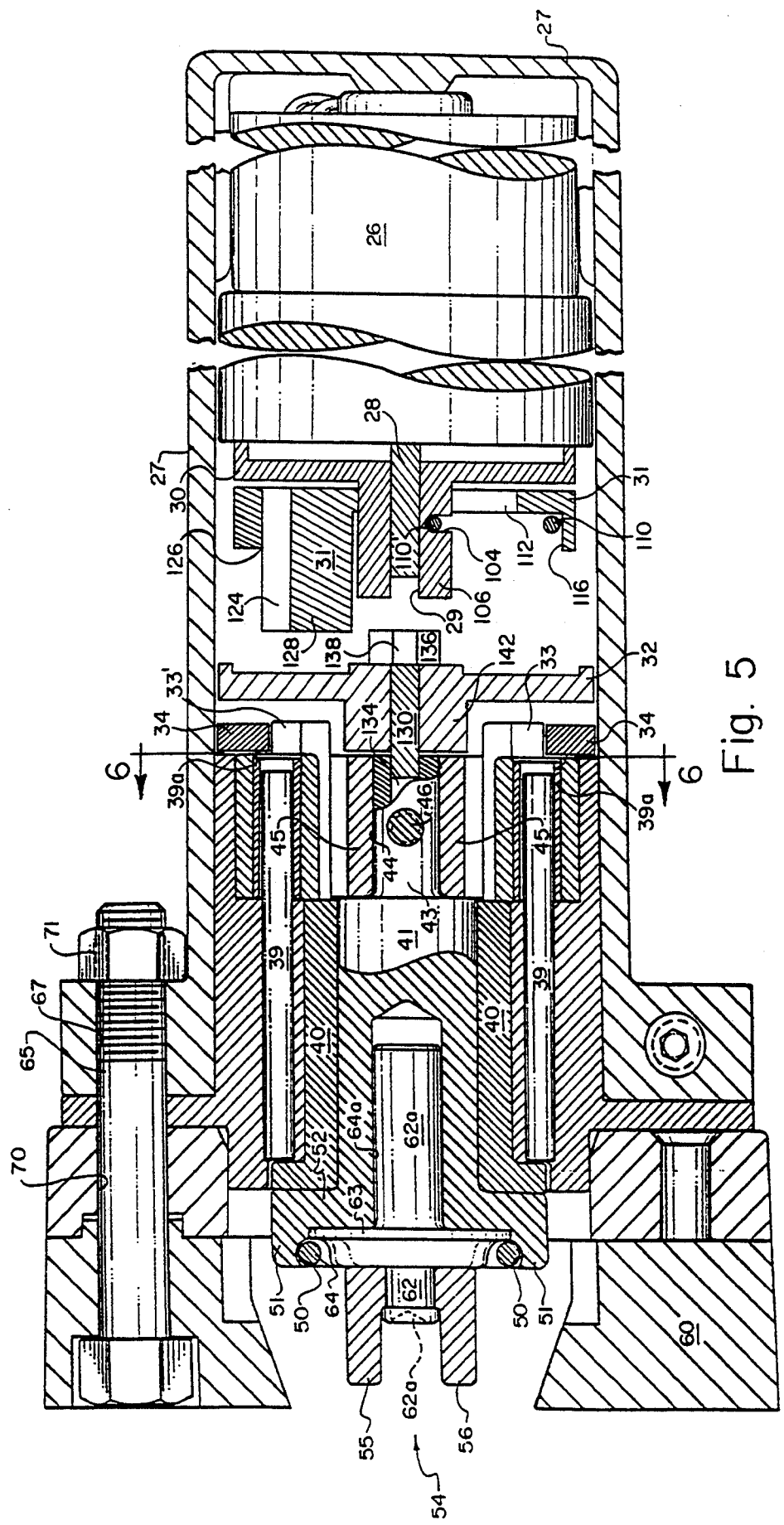

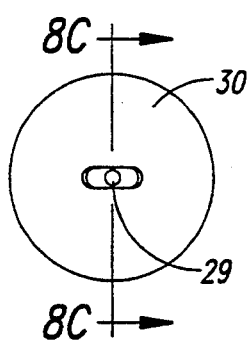
Fig. 8A
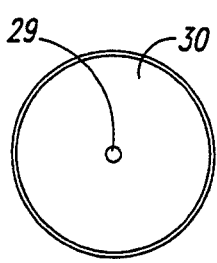
Fig. 8B
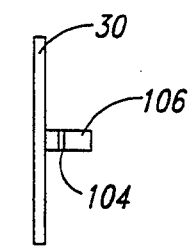
Fig. 8C
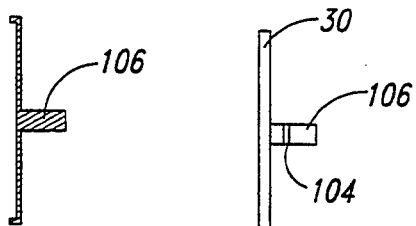
Fig. 8D
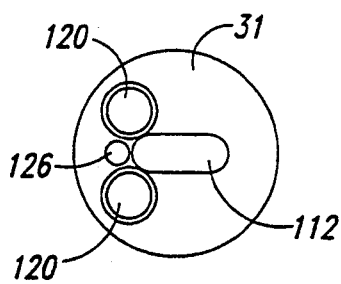
Fig. 8E
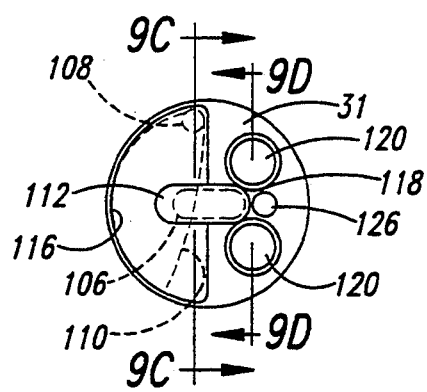
Fig. 9A
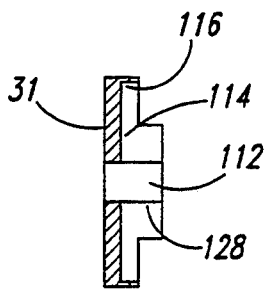
Fig. 9B
Fig. 9C
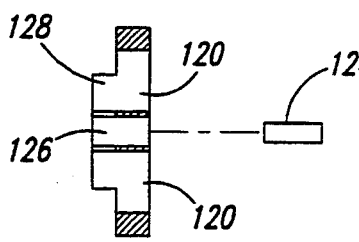
Fig. 9D
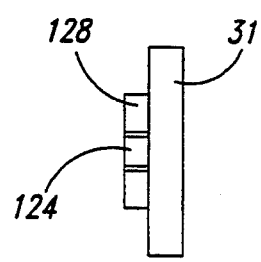
Fig. 9E
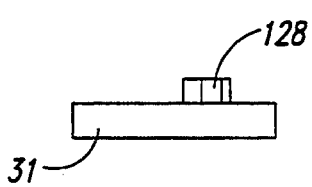
Fig. 9F
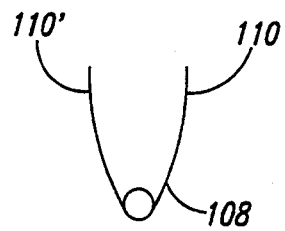
Fig. 9G
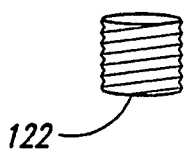
Fig. 9H

HIGH-EFFICIENCY, HIGH-SPEED CONTROL UNIT FOR CHAIN SHIFTER

TECHNICAL FIELD

This invention relates to the shifting of chains in chain driven devices to change the input to output drive ratios of the devices. More particularly, it relates to efficient, high-speed shifting of chains for bicycles and the like.

BACKGROUND OF THE INVENTION

U.S. Pat. No. 4,127,038 discloses a sprocket shift assembly wherein a chain is moved from sprocket to sprocket, the sprockets being of different diameter, while maintaining a positive drive connection during shifting. The chain is shifted from a sprocket around which the chain is entrained to a receiving sprocket by pivoting a sector of the receiving sprocket so that it is aligned with the teeth of the chain entrained sprocket. After the chain has been shifted to the receiving sprocket the sector is returned to its original position with the chain entrained thereon.

U.S. Pat No. 4,580,997 discloses a two-speed sprocket and chain shift assembly. One sprocket has a small pivoted sprocket segment. A shifting mechanism shifts the chain, entrained on one sprocket, to another by pivoting the sprocket segment to align it with the chain. The patent also discloses the use of a pawl housing and pivotable cam to direct travel of a pawl carried by the sprocket as necessary to shifting or non-shifting of the sprocket and chain assembly.

U.S. Pat. No. 4,894,046 discloses a control unit for a chain shifter using a reversible electric selector motor to position a cam assembly within a pawl guide housing. A traveling pawl is thereby directed as necessary for chain shifting. A spring loaded latch key positions the cam selector. The spring biases left and right latch arms apart so that they hold the cam selector in a centered position. In operation, the motor must push one of two latch arms away from the latch key to permit the cam selector to rotate. The spring forces the latch members against the key and thus the motor must exert significant force to overcome the spring's force and move the latch key. The force required by the motor puts significant demands on the battery driving the motor. As a result, the battery must be frequently replaced. Alternatively, a larger battery may be used, however, a large and heavy battery is not suitable for use with a bicycle.

Moreover, the force output from a motor is not instantaneous, but rather, builds over time. The motor in the above system must push against one of the latch arms for a period of time until the motor exerts a force great enough to move the latch arm. Not only does this place further demands on the battery, but the time delay between activation of the motor and shifting of the chain may be undesirable.

Consequently, there is a need for an improved control unit for a chain shifter which has increased power efficiency. Additionally, there is a need for an improved control unit for a chain shifter which is capable of rapid positioning of the cam selector.

SUMMARY OF THE INVENTION

The present invention solves these and other problems of the prior art by using, in part, impact forces generated by accelerating an unbalanced eccentric to achieve enough force to actuate a spring loaded cam assembly.

The control unit comprises a reversible electric selector motor connected to an eccentric assembly. The eccentric assembly includes an eccentric driver attached to the motor, and a hammer or eccentric slideably attached to the eccentric driver. The eccentric may slide about a slotted aperture. A spring biases the eccentric so that it is axially aligned with the eccentric driver.

As the motor begins to rotate, the eccentric driver and the eccentric similarly rotate and begin to accelerate. The eccentric is unbalanced so that as it rotates, it exerts a force radially outward, away from axial alignment with the eccentric driver. As the eccentric assembly continues to accelerate, it reaches a point at which the force generated by accelerating the mass of the eccentric overcomes the spring force and thus the eccentric slides away from axial alignment with the eccentric driver by way of the slotted aperture. When the eccentric is not axially aligned with the eccentric driver, the eccentric may impact a latch trip.

The latch trip is positioned between a pair of left and right pivot latch arms. A spring biases portions of the latch arms apart and a key is positioned between the latch arms and is held by the latch arms and the spring when the latch trip is centered. When the eccentric impacts the latch trip, the latch trip transfers the impact force to one of the latch arms, moving the arm away from the key. The other latch arm, by way of the spring, rotates the key. A spindle transmits the rotary motion of the key to a cam selector to permit shifting of the chain.

Importantly, the present invention rotates and accelerate a member having a small mass, i.e. the eccentric. As is well known, force is equal to mass times acceleration. If the mass is kept to a minimum, little force is required to accelerate this mass. The motor is able to rotate and accelerate the low mass eccentric of the present invention rapidly and without placing undue energy demands on the battery. The mass of the eccentric is accelerated to generate a force sufficient enough, so that when it impacts and transfers this force to the latch trip, the latch trip has sufficient force to push a latch arm away from the key. The force generated by the eccentric is substantially simultaneously transferred from the eccentric to one of the latch arms by way of the latch trip positioned therebetween.

Other features and associated advantages of the present invention will become apparent from studying the following detailed description of the presently preferred exemplary embodiments, together with the following drawings.

BRIEF DESCRIPTION OF THE DRAWINGS

FIG. 2 is an enlarged side elevation view of the control unit of the present invention, shown mounted on a fragmentary bicycle frame.

FIG. 3 is a side elevation view of the control unit.

FIG. 5 is an enlarged cross sectional view, taken on the line 5—5 of FIG. 4.

FIG. 8A is a top plan view of the eccentric driver of the present invention.

FIG. 8B is a bottom plan view of the eccentric driver of FIG. 8A.

FIG. 8C is a cross-sectional view of the eccentric driver of the present invention, taken along the line 8C—8C of FIG. 8A.

FIG. 8D is a left side elevational view of the eccentric driver of FIG. 8A.

FIG. 8E is a front elevational view of the eccentric driver of FIG. 8A.

FIG. 9A is a top plan view of the eccentric of the present invention.

FIG. 9B is a bottom plan view of the eccentric of FIG. 9A.

FIG. 9C is a cross-sectional view of the eccentric, taken along the line 9C—9C of FIG. 9A.

FIG. 9D is a cross-sectional view taken along the line 9D—9D of FIG. 9A.

FIG. 9E is a right side elevational view of the eccentric of FIG. 9A.

FIG. 9F is a front elevational view of the eccentric of FIG. 9A.

FIG. 9G is a top plan view of the spring of the present invention.

FIG. 9H is an isometric view of the eccentric weight 122 of the present invention.

DETAILED DESCRIPTION OF THE PRESENTLY PREFERRED EMBODIMENT

Figure 1:
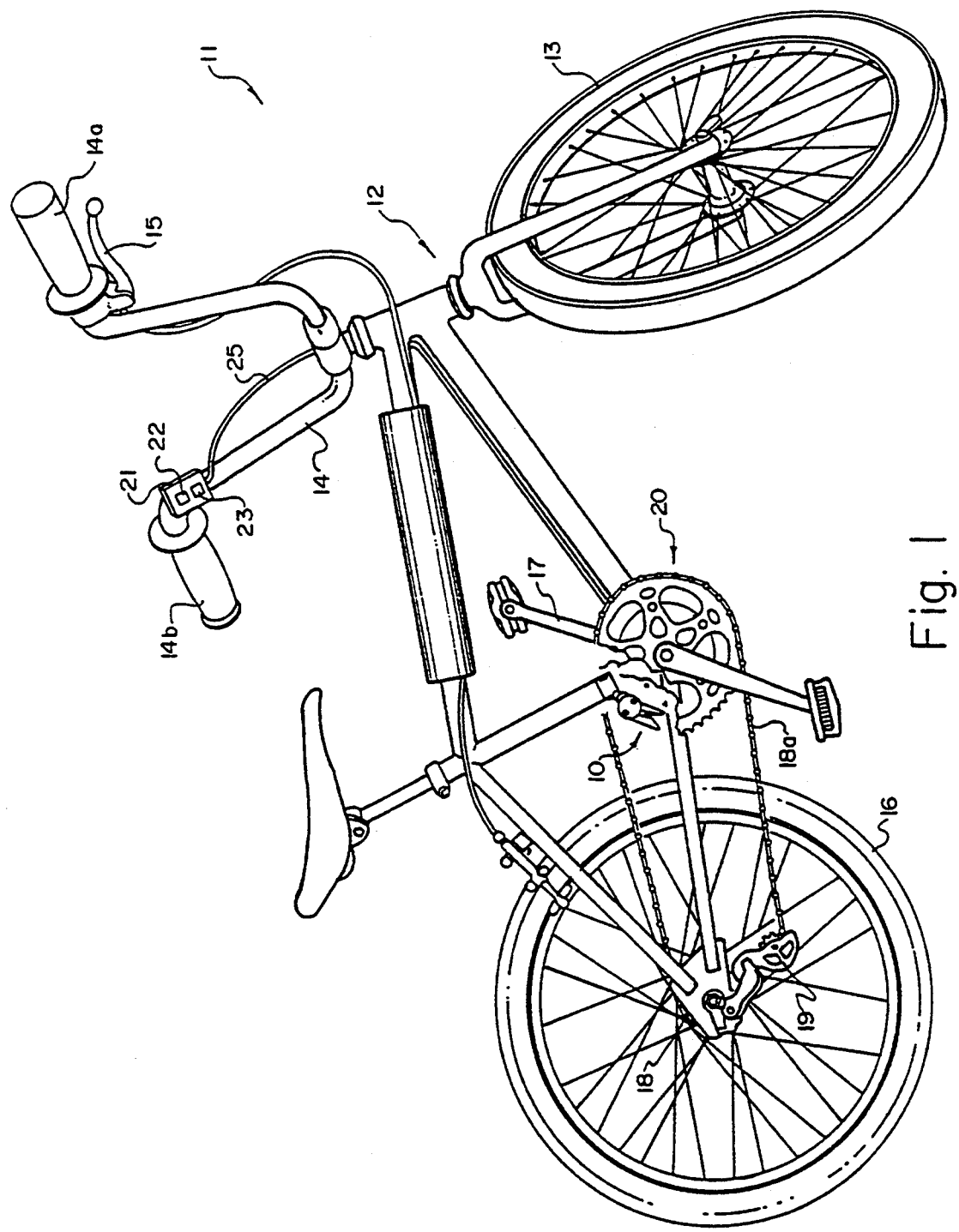
FIG. 1 is an isometric view of a bicycle equipped with the control unit for a chain shifter of the present invention.
Figure 6:
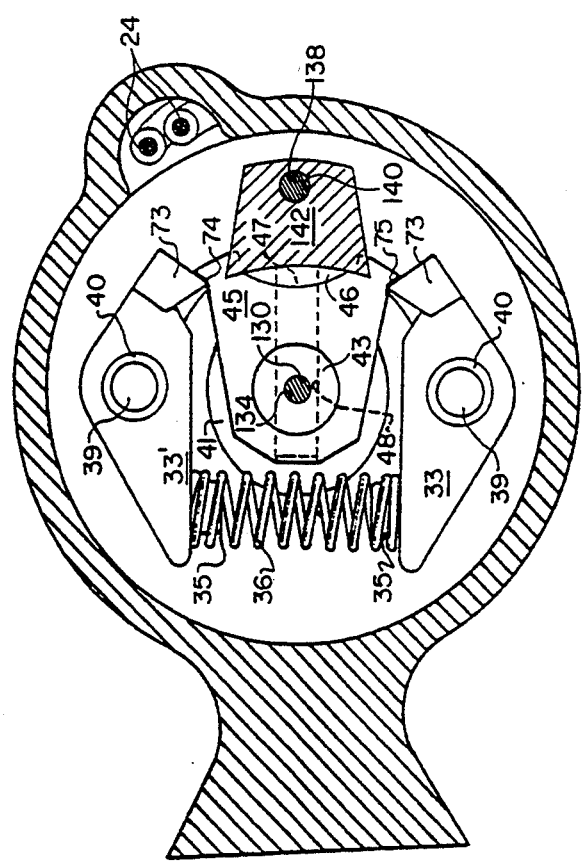
FIG. 6 is a sectional view taken on the line 6—6 of FIG. 5.

FIG. 1 shows a control unit 10 mounted on a bicycle shown generally at 11. As shown, the bicycle 11 includes the usual frame 12, front wheel 13, handlebars 14, handlebrake control 15 adjacent one handle grip 14a, rear wheel 16, pedal crank 17, rear sprocket 18 on the rear wheel, chain 18a, a chain tightener 19 and a sprocket assembly 20 on the crank. The sprocket assembly 20 is preferably of the type disclosed in U.S. Pat. No. 4,580,997, with a pivoted sprocket segment and a pawl that is directed through different travel paths to cause pivoting of the sprocket segment and shifting of a chain entrained on the sprocket assembly.

Figure 7:
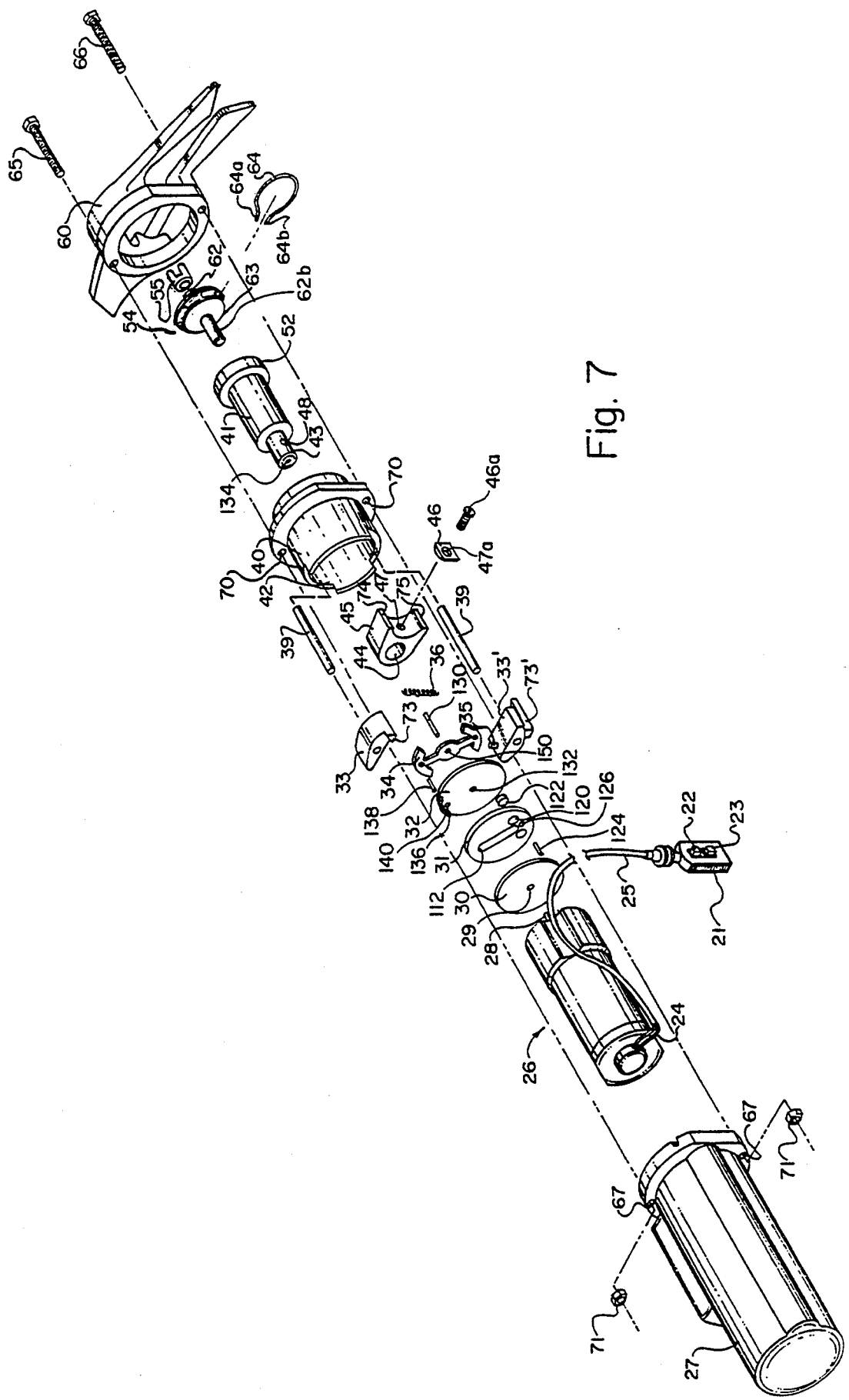
FIG. 7 is an exploded isometric view of the control unit.
Figure 10A:
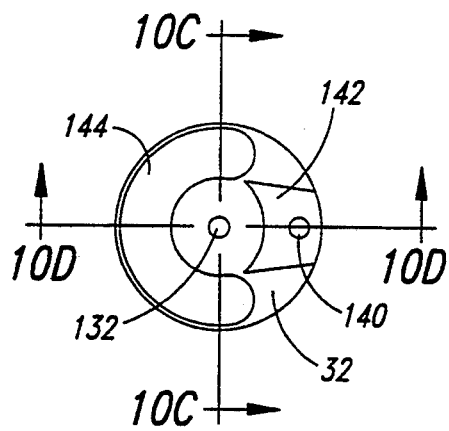
FIG. 10A is a top plan view of the latch trip of the present invention.
Figure 10B:
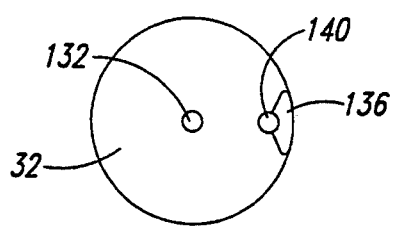
FIG. 10B is a bottom plan view of the latch trip of FIG. 10A.
Figure 10C:
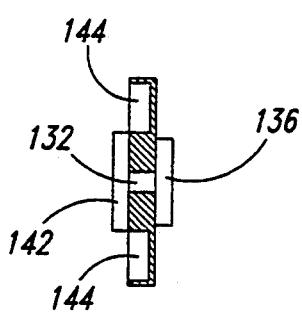
FIG. 10C is a cross-sectional view of the latch trip, taken along the line 10C—10C of FIG. 10A.
Figure 10D:
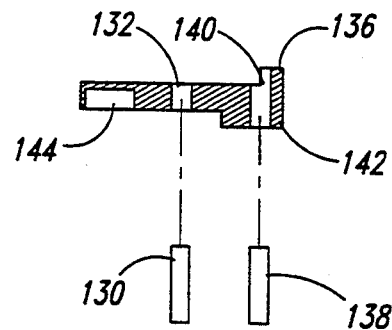
FIG. 10D is a cross-sectional view, taken along the line 10D—10D of FIG. 10A.
Figure 10E:
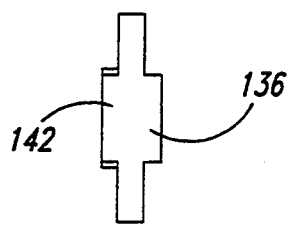
FIG. 10E is a right side elevational view of the latch trip of FIG. 10A.
Figure 10F:
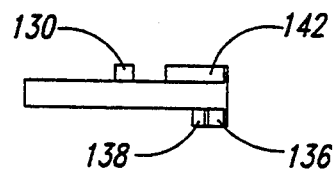
FIG. 10F is a front elevational view of the latch trip of FIG. 10A.

A control switch 21 is mounted adjacent on handlebars 14 adjacent to the other handgrip 14b and has an "UP" button 22 and a "DOWN" button 23. Referring to FIGS. 2 and 7, electrical wires 24 extend through a protective sheath 25 from switch 21 to a reversible electric motor 26 (FIG. 7). The motor 26 telescopes into a housing 27 that serves as a container for a battery, not shown, that provides power for the motor. Due to the high efficiency of the present invention, a smaller battery may be used than that required of prior systems.

An output shaft 28 of the motor 26 extends into a bore 29 of an eccentric driver 30. The eccentric driver 30 interfaces with a hammer or eccentric 31 and a latch trip 32. The eccentric driver 30, eccentric 31 and latch trip 32 are described more fully below with respect to FIGS. 8A-8E, 9A-9H and 10A-10F.

A pair of latch arms 33 and 33' are respectively positioned at opposite sides of a latch trip member 142 extending from the face of the latch trip 32. A pin 35 projects from the face of each latch arm and a spring 36 is adapted to fit between the latch arms, with the ends of the spring telescoped over the pins and with the spring then biasing opposed end portions of the latch arms away from one another.

The spring 36 biases the latch arms 33 and 33' apart, pivoting them on pins 39 and against a key 45. The key 45 is positioned between the latch arms and held by the latch arms and the spring when the latch trip member 142 is centered between the latch arms. When the latch trip member is turned, one of the latch arms is moved from the key allowing the spring and the other latch arm to rotate the key.

The latch arms are each pivoted on one end of the pin 39, the other end of the pin extending into a bushing 39a. The bushings 39 extend through bores 40a in a bushing 40. A pin plate 34 receives the one end of the pins 39 to retain the latch arms 33 and 33' within the bushing 40.

A spindle 41 telescopes into a bore 42 of the bushing 40 and a shaft 43 projecting from the spindle telescopes into a bore 44 of a key 45. A locking screw 46A, inserted through a hole 47A in a key adjusting plate 46, a hole 47 in the key 45 and a hole 48 in the shaft 43 locks the key to the shaft. When the locking unit is assembled, the key 45 is positioned between the latch arms 33 and 33'.

The key 145, as well as the latch arms 33 and 33', are preferably made of a durable, resilient material such as plastic, preferably DELRIN TM brand plastic. The key adjusting plate 46 preferably has a convex surface which rests against a concave portion of the key 45. As the locking screw 46A is tightened, the convex surface of the key adjusting plate 46 forces the concave portion of the key 45 outwardly, and into contact with the latch arms 33 and 33'.

Figure 4:
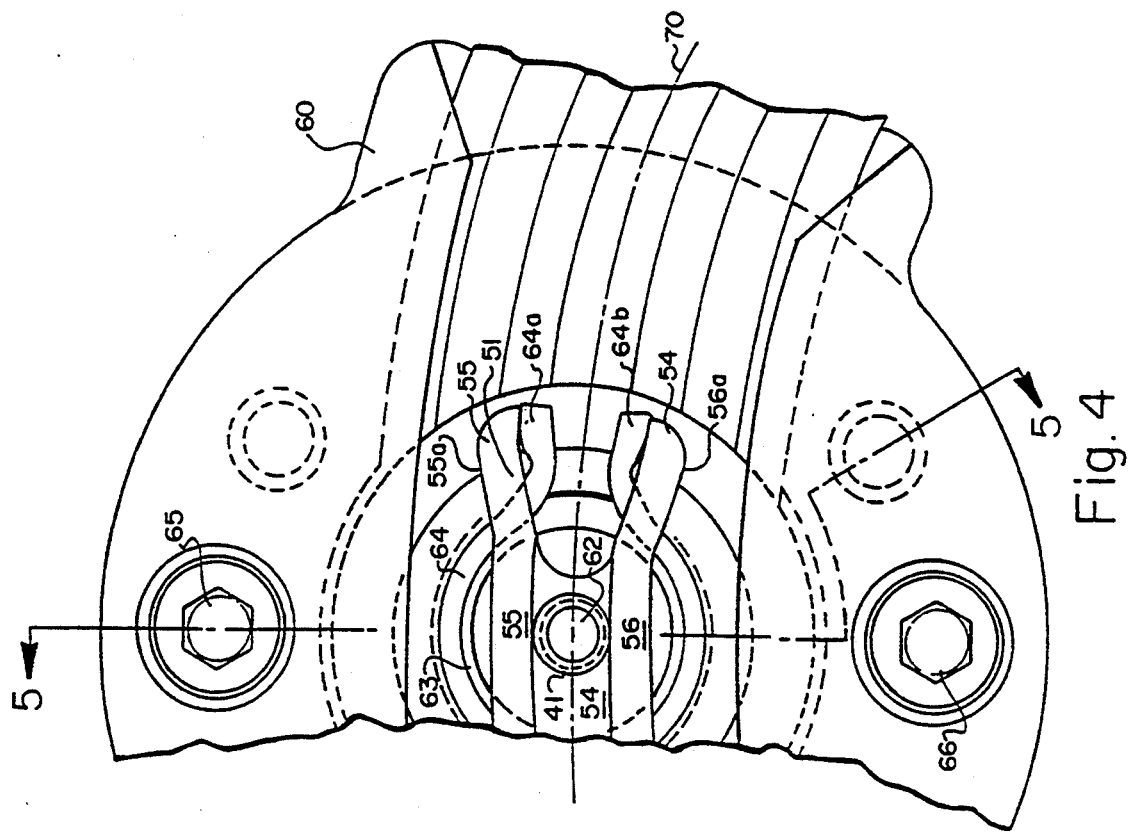
FIG. 4 is an enlarged end elevation view.

As shown in FIGS. 4 and 5, a groove 50 is formed in a flange 51 that extends from a collar 52 on the spindle 41. A cam selector 54, which is preferably of the type disclosed in U.S. Pat. No. 4,580,997, has upper and lower cam surfaces 55 and 56. The cam selector 54 fits into a pawl guide housing 60, also preferably of the type disclosed in the aforesaid U.S. patent. The pawl guide housing 60 is fixed to bicycle frame 12.

A pivot shaft 62 having a head 62a projects through the cam selector 54 and is fixed to one side of a plate 63 that fits against collar 52. Another pin 62b at the opposite side of plate 63 telescopes into a central bore 64a of the spindle 41. A spring clip 64 snaps into groove 50 to hold the plate 63 against collar 51 and pin 64 in bore 64a. Ends 64a and 64b of the spring clip 64 respectively extend into engagement with the tail ends 55a and 56a of the cam surfaces 55 and 56, respectively, so that spring clip will turn in its groove 50 with turning of the cam activator 54 and the spring clip 64 will tend to center the cam surfaces 55 and 56 within the pawl guide housing 60.

Bolts 65 and 66 are provided to lock the control unit components together. The bolts extend through holes 67 in a flange 68 of housing 27. Holes 69 in a flange 70 of bushing 40 and are threaded into nuts 71. In operation, when the cam selector 54 is centrally positioned in the pawl guide housing, as shown in FIG. 2, the path (shown by arrow 70) of the pawl (not shown) is through the center guide path 71 of the cam selector 54. When the cam selector 54 is in this position, the latch arms 33 and 33' are in a balanced position at opposite sides of the latch trip member 142 and angled corners 73 and 73' of the latch arms 33 and 33' are respectively in engagement with sharp corner edges 74 and 75 of key 45.

Referring to FIGS. 8A through 8E, the output shaft 28 of the motor 26 extends through the bore 29 in the eccentric driver 30 and is fixedly attached thereto. A driving cam 106 extends axially from the center of the eccentric driver 30. Slots 104 and 104' on opposite sides of the driving cam 106 are designed to receive an end 110' of a spring 108 (shown in FIG. 9G).

Referring to FIGS. 9A through 9H, the driving cam 106 extends through a slotted aperture 112 in the eccentric 31. The slotted aperture 112 extends from the center to an circumferencial edge of the eccentric 31. The slotted aperture 112 is designed to receive the driving cam 106 and permit eccentric 31 to move both rotationally and translationally. The eccentric 31 may move laterally with respect to the driving cam 106, the driving cam simultaneously transmitting the rotational force of the motor 26 to rotate the eccentric 31. Preferably, the driving cam 106 has parallel flat surfaces which are received by parallel, longitudinal flat surfaces of the slotted aperture 112.

The spring 108 having ends 110 and 110' lies within a recess 114 in the front surface of the eccentric 31 (shown in dashed lines in FIG. 9A). The end 110 rests against and is affixed to an inner lip 116 along a radial edge of the recess 114. The end 110' extends across the slotted aperture 112 and through the slot 104 to retain the eccentric 31 against the eccentric driver 30, and prevent axial separation between them. When so retained, the spring 108 biases the driving cam 106 against a central edge of the slotted aperture 112 (shown in dashed lines in FIG. 9A) to axially align the eccentric 31 with the eccentric driver 30.

A pair of holes 120 extending axially through the eccentric 31 receive a pair of eccentric weights 122 (shown in FIG. 9H). The holes 120 are positioned proximate to the circumference of the eccentric 31, away from the slotted aperture 112, thereby placing the weights 122 a distance from the axial center of the eccentric. The eccentric 31 is preferably made from a resilient, durable material. The outer edges of the weights 122 are preferably knurled or threaded, such that, when they are inserted into the holes 120, they are fixedly retained therein.

A pin 124 extends through a bore 126 in the top surface of the eccentric 31, proximate to the circumferential edge. An actuating flange 128 axially extends above the top surface of the eccentric 31, between the slotted aperture 112, the holes 120 and the bore 126. As described more fully below, the pin 124 and the actuating flange 128 impact the latch trip 32 when the eccentric 31 achieves a sufficient velocity to overcome the force of the spring 108, permitting the eccentric 31 to slide laterally about the slotted aperture 112.

Referring to FIGS. 10A–10F, the latch trip 32 pivots on an axle 130 extending axially through a central bore 132 in the latch trip, and into a hole 134 in the spindle 41. An actuating projection 136 extends axially from a circumferential edge of the bottom surface of the latch trip 32.

The latch trip member 142 is located on the top surface of the latch trip 32, opposite the actuating projection 136. A latch trip pin 138 extends axially through a hole 140 in the latch trip member 142. A horseshoe-shaped recess 144 is formed in the top surface of the latch trip 32, around the latch trip member 142.

Figure 11:
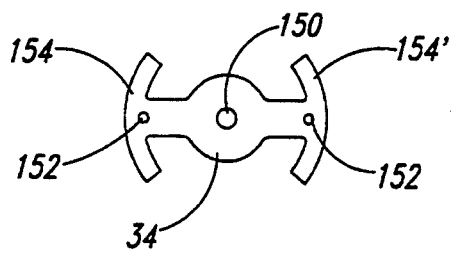
FIG. 11 is a top plan view of the pin plate of the present invention.

Referring to FIG. 11, a central hole 150 extends axially through the pin plate 34. The axle 130 extends through the hole 150 and into the hole 138 of the spindle 41. Bores 152 in opposite arms 154 and 154' of the pin plate 34 receive the one ends of the pins 39. Should these ends of the pins 39 extend above the surface of the pin plate 34, they would extend into the horseshoe-shaped recess 144, thereby preventing the pins 39 from inhibiting rotation of the latch trip 32 about the axle 130. The arms 154 and 154' are preferably designed to be fixedly received by a notched end in the bushing 40. The pin plate 34 permits the latch trip member 142 to extend therethrough and between the latch arms 33 and 33'.

Operation of the system will now be described.

Pushing "UP" switch 22 will provide an electrical pulse, preferably on the order of 30 milliseconds, operating motor 26 to rotate the output shaft 28 and the eccentric driver 30 affixed thereto in a first rotational direction. The driving cam 106 transfers the rotational movement of the eccentric driver 130 to the eccentric 131, causing the eccentric 131 to rotate about its central axis.

The eccentric weights 122 are placed proximate to the actuating flange 128 in the eccentric 31 so as to locate the center of mass of the eccentric 31 away from its central axis. The center of mass is preferably proximate to the centerline and opposite circumferential edge of the slotted aperture 112. Consequently, as the off-balanced eccentric 31 rotates about its central axis, centrifugal force causes the eccentric 31 to move laterally with respect to the driving cam 106, about the slotted aperture 112. From rest, as the eccentric 31 beings to rotate, the centrifugal force increases until it counteracts and exceeds the opposite force exerted by the spring 108, translating the center of mass radially outwardly from the driving cam. The force exerted by the spring 108 is sufficiently great to permit the eccentric 31 preferably complete several rotations before sufficient centrifugal force is generated.

When the eccentric 31 rotates about its central axis, the actuating flange 128 and pin 124 fail to contact with the actuating projection 136 on the latch trip 32. As the eccentric 31 translates laterally outward, away from axial alignment with the eccentric driver 30, the actuating flange 128 and the pin 124 contact the actuating projection 136 and the latch trip pin 138. The angular force from the eccentric 31 is transferred, via the actuating flange 128, to the latch trip 132, via the actuating projection 136.

The pin 124 and latch trip pin 138 are preferably composed of metal to provide efficient transfer of the angular force. Use of metal pins also reduces wear at this contact point.

The angular force transferred from the eccentric 31 to the latch trip 32 causes the latch trip 32 to rotate about the axle 130, forcing the latch trip member 142 against one of the latch arms 33 or 33'.

This rotation of the latch trip member 142 moves the one latch arm away from a corner edge 74 or 75 and allows the spring 36 to force the other latch arm to act against the key and to rotate the key in a first direction around the shaft 43.

Rotation of the key is transmitted through the spindle 41 to the cam selector 54. The cam selector is thus skewed to direct the pawl above or below the center guide path 70. As the pawl passes through the available path it engages a curved cam guide surface tail portion, i.e., 55a or 56a, to force it back to the centered position.

Actuation of "DOWN" button 23 will cause the motor to operate in a reverse direction and to pivot the cam selector in an opposite direction.

Pivoting the cam selector will then effect shifting of the chain in a manner as disclosed in U.S. Pat. No. 4,580,997.

With the present invention, the mass of the eccentric driver 30 and the eccentric 31 is preferably reduced to a minimum, without sacrificing durability. Preferably, the eccentric driver 30 is composed of aluminum, while the eccentric 31 is composed of DELRIN ™. As a result of the low mass, only a minute electrical pulse and thus little energy is required to rotate these components. Furthermore, the motor requires less time to rotate the assembly to an acceleration sufficient to counteract the force of spring 108. Thus, the system is capable of higher speed control of the chain shifter than prior systems.

Those skilled in the art will appreciate that the mass of the weights 122 and the angular acceleration of the eccentric 31 are selected to provide sufficient angular force to the latch trip 32 such that the latch arms 33 and 33' may be moved. The mass of the weights 122 are preferably kept to a minimum for the above reasons of efficiency and speed.

The rotation of the motor creates a small rotational force on the eccentric 31 which is translated to, and rotates, the latch trip 32. The small rotational force of the latch trip 32 is then magnified as the spring 36 turns the latch arms to rotate and turn the latch key. The latch arms are returned to their latched position, i.e., with angled corners 73 and 73' in engagement with corner edges 74 and 75 of key 45 when the pawl moves past the cam selector 54.

While the above-detailed description is believed to be sufficient to permit those skilled in the art to reproduce the invention, all U.S. patents noted above are incorporated herein by reference, should any additional information be necessary.

Although a preferred form of the present invention has been disclosed above, various modifications can be made without departing from the spirit and scope of the invention, as is known by those skilled in the art. Accordingly, the invention is not limited by the disclosure, but instead its scope is to be determined entirely by reference to the following claims.

I claim:

1. In a control unit for a chain shifter of the type having a cam that is rotatable in opposite directions from a neutral position to respective up-shift and down-shift positions, means for resiliently biasing said cam toward said up-shift and down-shift positions, and a latch mechanism having first and second latch members for holding said cam in said neutral position but selectively releasing said cam to allow said cam to rotate to said up-shift position when said first latch member is actuated in one direction and to allow said cam to rotate to said down-shift position when said second latch member is actuated in a direction opposite the actuation of said first latch member, a system for selectively actuating said first and second latch members using relatively little power, comprising:

a shift selector generating an up-shift signal to shift said chain shifter up and a down-shift signal to shift said chain shifter down;

a rotary actuator coupled to said shift selector, said rotary actuator rotating in one direction responsive to receipt of said up-shift signal from said shift selector and in an opposite direction responsive to receipt of said down-shift signal from said shift selector; and a hammer member coupled to said rotary actuator, said hammer member freely rotating with said rotary actuator before striking one of said latch members, said hammer member striking said first latch member to allow said cam to rotate to said up-shift position when said rotary actuator rotates in response to said up-shift signal, said hammer member striking said second latch member to allow said cam to rotate to said down-shift position when said rotary actuator rotates in response to said down-shift signal.

2. The system as in claim 1 wherein said hammer member is slideably attached to the rotary actuator so as to permit rotation and translation of said hammer member.

3. A system as in claim 2 further comprising a spring biasing said hammer member in a first direction, and wherein, upon rotation of said hammer member, said hammer member moves in a second direction, permitting said hammer member to strike one of said first and second latch members to allow said cam to rotate.

4. A system as in claim 3 wherein said hammer member and said rotary actuator are aligned about a central axis in the first direction.

5. A system as in claim 1 further comprising a latch trip positioned between said hammer member and said first and second latch members, wherein said latch trip strikes one of said first and second latch members to allow said cam to rotate in response to said hammer member striking said latch trip.

6. An electric motor driven assembly for shifting a chain between sprockets, comprising:

a pair of pivoted latch arms;

a spring biasing portions of the latch arms apart;

a key positioned between the latch arms and held by the latch arms and the spring;

a latch trip having a latch trip member positioned between the latch arms;

an eccentric assembly, selectively rotated by the motor, capable of rotating the latch trip member in a first direction and into contact with a latch arm, causing rotation of the key by the spring means; and a spindle, coupled to the key, capable of transmitting rotary motion of the key to thereby cause shifting of the chain.

7. An assembly as in claim 6 wherein the eccentric assembly comprises:

an eccentric driver fixedly attached to the motor;

an eccentric slideably attached to the eccentric driver so as to permit rotation and translation of the eccentric by the motor; and wherein the latch trip is selectively actuated by the eccentric.

8. An assembly as in claim 7 wherein the eccentric includes a spring biasing the eccentric in a first position, and wherein, upon rotation of the eccentric by the motor, the eccentric moves toward a second position, actuating the latch trip.

9. An electric motor driven assembly for shifting a chain between sprockets, comprising:
   a pair of pivoted latch arms;
   spring means, received by the latch arms, for biasing portions of the latch arms apart;
   rotation means, positioned between the latch arms and held by the latch arms and the spring, for transmitting rotary motion to thereby cause shifting of the chain;
   trip means for moving the latch arms; and
   actuating means, selectively rotatable by the motor, for actuating the trip means in a first direction and into contact with a latch arm when the actuating means translates toward a first position.

10. A method of actuating a pair of latch members in a chain shift controller to release a shift actuating cam from a neutral position to allow said cam to rotate to an up-shift position when one latch member is actuated in one direction and to allow said cam to rotate to a down-shift position when the other latch member is actuated in an other direction, said method comprising:
   accelerating a mass in said one direction when said cam is to be rotated to said up-shift position;
   after said mass has been accelerated in said one direction, allowing said mass to strike said one latch member, thereby releasing said cam to rotate to said up-shift position;
   accelerating a mass in said other direction when said cam is to be rotated to said down-shift position; and
   after said mass has been accelerated in said other direction, allowing said mass to strike said other latch member, thereby releasing said cam to rotate to said down-shift position.

* * * * *